United States Patent [19]

Mihara

[11] Patent Number: 5,293,534
[45] Date of Patent: Mar. 8, 1994

[54] LIQUID CRYSTAL DEVICE

[75] Inventor: Tadashi Mihara, Kawasaki, Japan

[73] Assignee: Canon Kabushiki Kaisha, Tokyo, Japan

[21] Appl. No.: 920,884

[22] Filed: Jul. 28, 1992

Related U.S. Application Data

[62] Division of Ser. No. 620,052, Nov. 30, 1990, Pat. No. 5,182,662.

[30] Foreign Application Priority Data

Dec. 1, 1989 [JP] Japan .................................. 1-310732

[51] Int. Cl.$^5$ .................................................. G02F 1/133
[52] U.S. Cl. ........................................ 359/84; 359/56; 359/63; 345/87
[58] Field of Search .................. 359/63, 54, 55, 56, 359/75, 84, 85, 100; 340/784

[56] References Cited

U.S. PATENT DOCUMENTS

| | | | |
|---|---|---|---|
| 4,367,924 | 1/1983 | Clark et al. | 359/56 |
| 4,561,726 | 12/1985 | Goodby et al. | 359/75 |
| 4,589,996 | 5/1986 | Inoue et al. | 252/299.65 |
| 4,596,667 | 6/1986 | Inukai et al. | 252/299.65 |
| 4,613,209 | 9/1986 | Goodby et al. | 359/104 |
| 4,614,609 | 9/1986 | Inoue et al. | 252/299.65 |
| 4,615,586 | 10/1986 | Geary et al. | 359/100 |
| 4,747,671 | 5/1988 | Takahashi et al. | 359/56 |
| 4,763,992 | 8/1988 | Takada et al. | 359/100 |
| 4,765,720 | 8/1988 | Toyono et al. | 359/100 |
| 4,776,676 | 10/1988 | Inoue et al. | 359/56 |
| 4,783,149 | 11/1988 | Umeda et al. | 359/72 |
| 4,790,631 | 12/1988 | Yamazaki | 359/55 |
| 4,796,980 | 1/1989 | Kaneko et al. | 359/56 |
| 4,818,078 | 4/1989 | Mouri et al. | 359/100 |
| 4,824,218 | 4/1989 | Kuno et al. | 359/56 |
| 4,893,117 | 1/1990 | Blomley et al. | 359/85 |
| 4,932,758 | 6/1990 | Hanyu et al. | 359/100 |
| 4,952,032 | 8/1990 | Inoue et al. | 359/104 |
| 5,007,716 | 4/1991 | Hanyu et al. | 359/87 |

FOREIGN PATENT DOCUMENTS

| | | |
|---|---|---|
| 0307959 | 3/1989 | European Pat. Off. . |
| 0324433 | 7/1989 | European Pat. Off. . |
| 0381526 | 8/1990 | European Pat. Off. . |

OTHER PUBLICATIONS

Clark et al. "Appl. Phys. Lett." vol. 36, pp. 899-901 (1980).
Kotai et al., Solid State Physics, vol. 16 (1981) 12-22.
Meyer et al., Le Journal de Physique Letters, vol. 36 (1975) L69.

*Primary Examiner*—William L. Sikes
*Assistant Examiner*—Huy Mai
*Attorney, Agent, or Firm*—Fitzpatrick, Cella, Harper & Scinto

[57] ABSTRACT

A liquid crystal device is formed by disposing a ferroelectric smectic liquid crystal having two stable molecular orientation states between opposite electrodes formed on a pair of substrates, and disposing a polarizer and an analyzer in proximity with the substrates so that one of the two molecular orientation states provides a bright state and the other molecular orientation state provides a dark state. In case where a domain with a minor areal size changing with time occurs in an effective display area in either one (or both) of the bright and dark display states of the display area, the polarizer and analyzer are disposed in such a position that the domain with a minor areal size changing with time is present (in a larger total area when it is present) in the bright state (than when it is present in the dark state), whereby improvements are attained in respects of flickering persistence, contrast and/or transmittance.

2 Claims, 14 Drawing Sheets

WHITE DISPLAY STATE

BLACK DISPLAY STATE

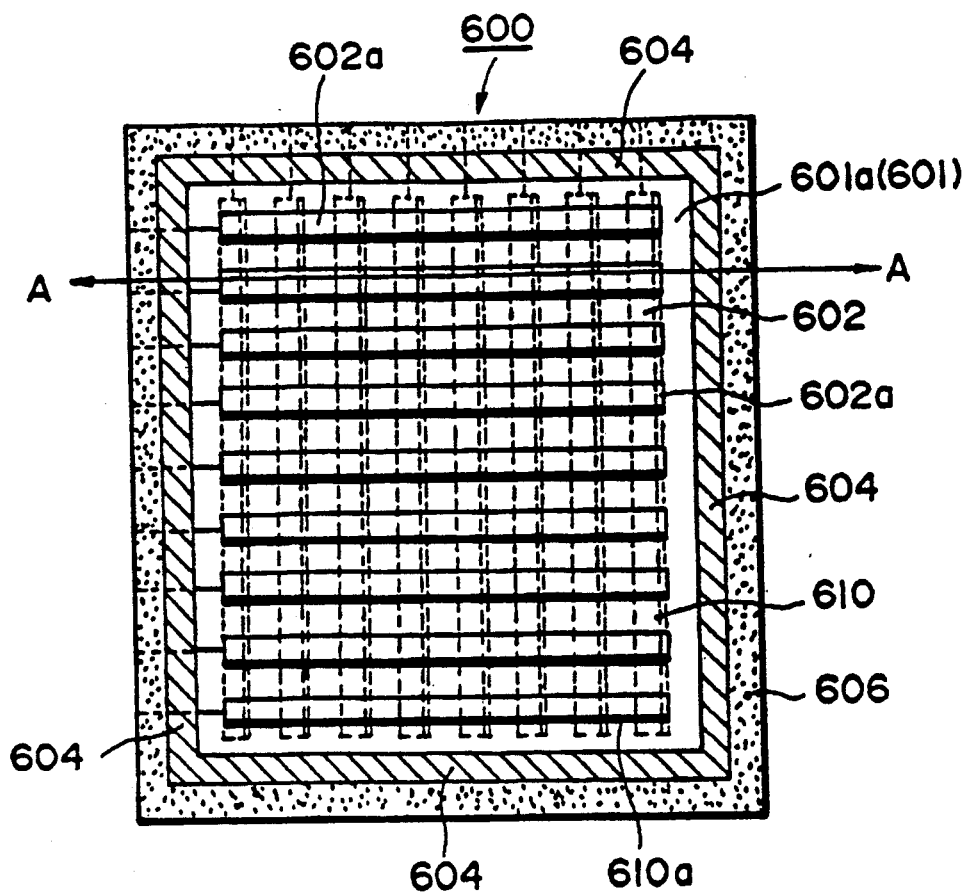
F I G. 6A
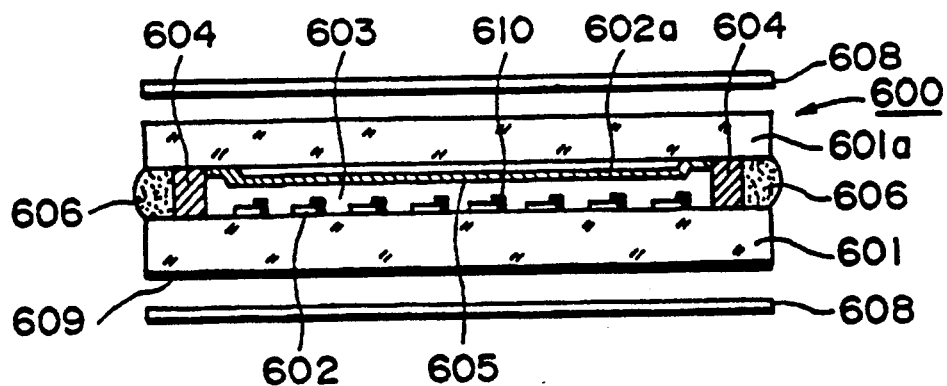
F I G. 6B

WHITE DISPLAY STATE

BLACK DISPLAY STATE

LIQUID CRYSTAL DEVICE

This application is a division of application Ser. No. 620,052, filed Nov. 30, 1990, now U.S. Pat. No. 5,182,662, issued Jan. 26, 1993.

FIELD OF THE INVENTION AND RELATED ART

The present invention relates to a liquid crystal device using a ferroelectric smectic liquid crystal suitably loaded on an image display or recording apparatus, particularly a ferroelectric smectic liquid crystal display device improved in contrast ratio and/or transmittance while suppressing flickering and persistence or after-image at the time of multiplexing drive.

A display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107217/1981, U.S. Pat. No. 4,367,924). The ferroelectric liquid crystal has generally chiral smectic C phase (SmC*) or H phase (SmH*), in which it is provided with a bistable orientation or alignment state where the liquid crystal molecules assume either one of a first optically stable state and a second optically stable state in response to an applied electric field, shows a memory characteristic of retaining the resultant state in the absence of an electric field, and also shows a high-speed response to a change in electric field, so that the ferroelectric liquid crystal is expected to be widely utilized in a high speed and memory type optical modulation device.

In the above-mentioned chiral smectic liquid crystal device, an electrode matrix comprising scanning electrodes and data electrodes wherein a scanning signal is sequentially applied to the scanning electrodes and data signals are applied to the data electrodes in synchronism with the scanning signal for multiplexing drive. During the multiplexing drive of such a chiral smectic liquid crystal device, there is observed flickering on a display picture (flickering caused due to a periodical change in luminance on the whole picture) in some cases when the device is driven in a refresh mode by periodically and repetitively applying a scanning signal to the scanning electrodes.

SUMMARY OF THE INVENTION

An object of the present invention is to provide a liquid crystal device having solved the above-mentioned problem of flickering.

Another object of the present invention is to provide a liquid crystal device having a high speed responsiveness.

According to the present invention, there is provided a liquid crystal device, comprising: a pair of substrates having thereon opposite electrodes, a ferroelectric smectic liquid crystal disposed between the electrodes so as to have two stable molecular orientation states, and a polarizer and an analyzer disposed adjacent to the substrates so that one of the two stable molecular orientation states provides a dark state and the other of the two stable molecular orientation states provides a bright state; wherein a domain with an areal size changing with time is formed in an effective display area, and the polarizer and the analyzer are disposed so that the domain is present (in a larger total area when it is present) in a bright state of the effective display area (than when it is present in a dark state of the effective display area).

As a result, the liquid crystal device may be suitably used as a liquid crystal display device having a high-speed responsiveness and improved display qualities, such as improved contrast and/or transmittance while suppressing flickering and persistence or after image.

BRIEF DESCRIPTION OF THE DRAWINGS

FIG. 6A is a plan view of a liquid crystal device used in the present invention, FIG. 6B is a sectional view taken along the line A—A in FIG. 6A.

DESCRIPTION OF THE PREFERRED EMBODIMENTS

Figure 11:
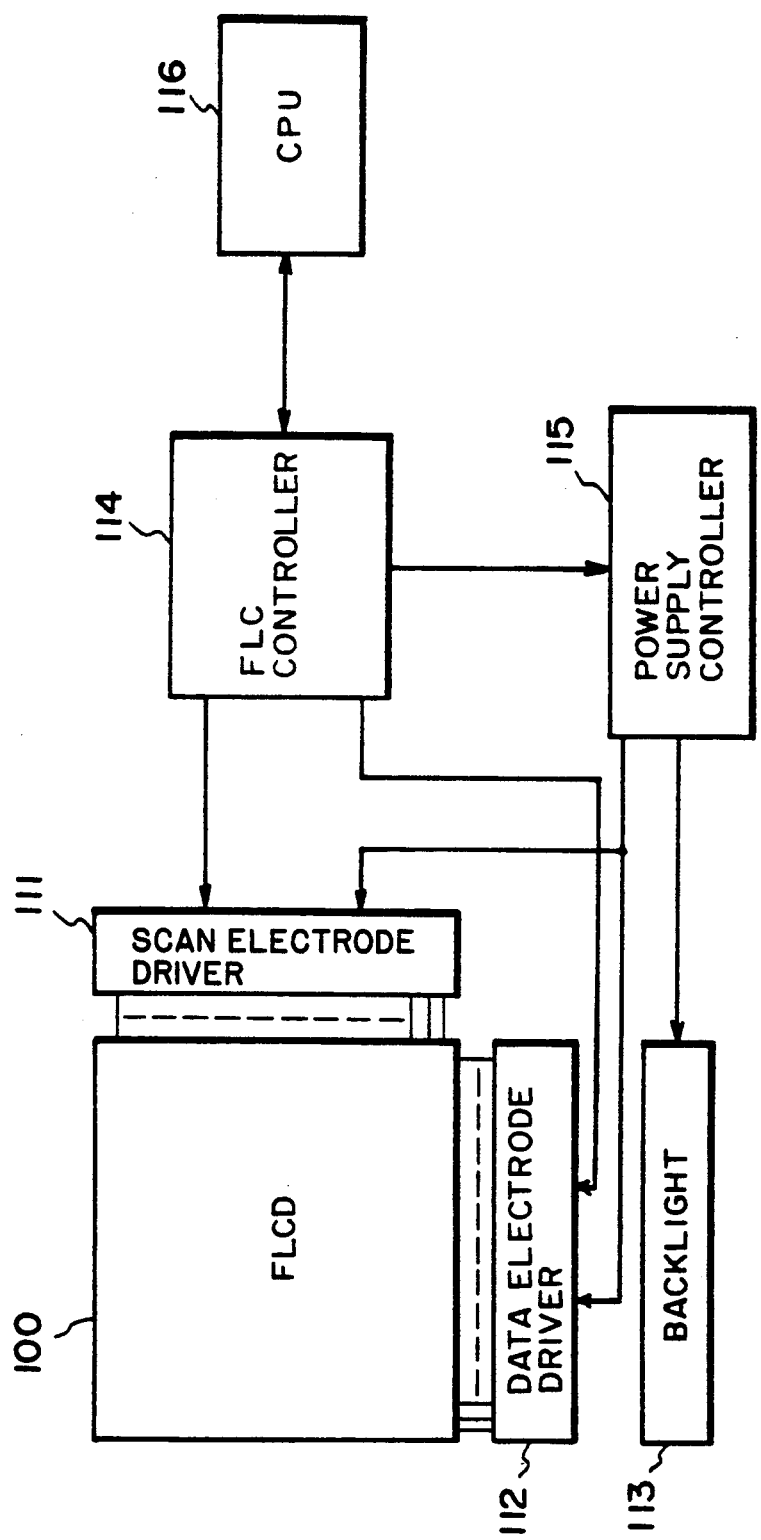
FIG. 11 is a block diagram showing a drive system applicable to the liquid crystal device of the invention.

FIG. 11 is a block diagram showing an example of a liquid crystal display apparatus including a liquid crystal device according to the present invention. FIG. 6A is a plan view of an embodiment of such a liquid crystal device, and FIG. 6B is a sectional view taken along the line A—A in FIG. 6A.

Referring to FIG. 11, the liquid crystal display apparatus includes a ferroelectric liquid crystal display device 100 as an embodiment of the liquid crystal device of the present invention, a scanning electrode driver 111 for applying a scanning signal voltage to scanning electrodes as a means for driving the liquid crystal device 100 a data electrode driver 112 for applying data signal voltages to data electrodes as another means for driving the liquid crystal device 100, a backlight 113 as a light source for illuminating the liquid crystal device 100, an FLC controller 114 as a means for controlling the liquid crystal display device, a power supply controller 115 as a means for supplying an electric power to the liquid crystal display device 100 and the backlight 113, and a computer 116 for controlling the operation of the entire liquid crystal display apparatus.

Figure 1:
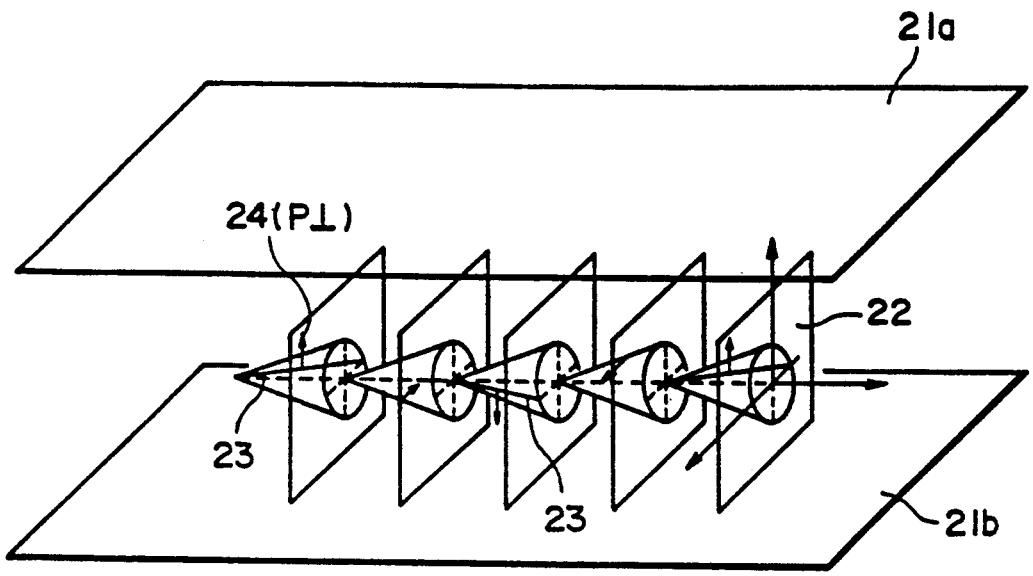
FIGS. 1 and 2 are respectively a schematic perspective view for illustrating an operation principle of a liquid crystal device according to the invention.

The microscopic structure of such a ferroelectric liquid crystal device 100 is illustrated in FIGS. 6A and 6B. The operation of such an ferroelectric liquid crystal device is explained to some extent. FIG. 1 illustrates schematically an example of a ferroelectric liquid crystal cell for explanation. Substrates (glass plates) 21a and 21b are coated with transparent electrodes of $In_2O_3$, $SnO_2$ or ITO (Indium Tin Oxide), etc., and a liquid crystal of SmC* (chiral smectic C phase) or SmH* (chiral smectic H phase) is hermetically disposed therebetween so that a plurality of liquid crystal molecular layers 22 are aligned perpendicular to the glass substrates. Full lines 23 represent liquid crystal molecules each having a dipole moment ($P_\perp$) 24. When a voltage above a certain threshold value is applied between the electrodes on the substrates 21a and 21b, the helical structure of the liquid crystal molecules 23 is unwound or released to orient the liquid crystal molecules 23 so that all the dipole moments ($P_\perp$) 24 may be directed in the electrical field direction. The liquid crystal molecules 23 have an elongated shape and show refractive anisotropy between the long axis and the short axis thereof. Accordingly, when, for instance, polarizers arranged in a cross nicol relationship i.e. with their polarizing directions being crossing each other are disposed on the upper and the lower surfaces of the glass plates, the liquid crystal cell thus arranged functions as a liquid crystal optical modulation device of which optical characteristics vary depending upon the polarity of an applied voltage.

Figure 2:
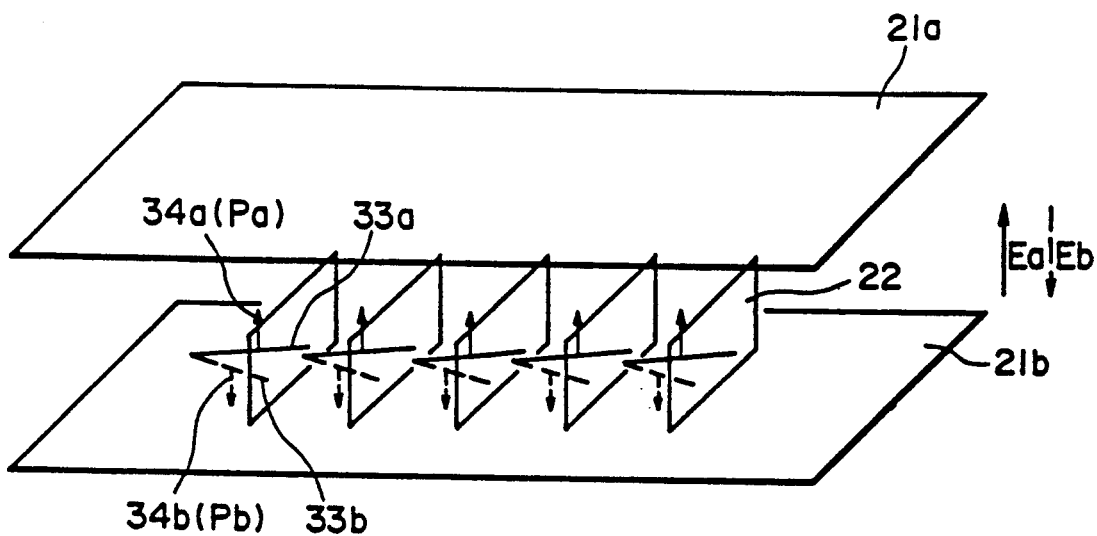

A liquid crystal cell preferably used in the present invention may have a sufficiently thin thickness (e.g., 10 microns or less). As the liquid crystal layer is in such a small thickness, the helical structure of the liquid crystal molecules will be unwound even under no application of electrical field to become a nonhelical structure as shown in FIG. 2, whereby its dipole moment assumes either Pa directed upward (34a) or Pb directed downward (34b), thus forming a bistable state. When an electrical field Ea or Eb with different polarity exceeding a certain threshold value is applied to such a cell through a voltage application means (not shown) as shown in FIG. 2, the dipole moment will change its direction upwardly 34a or downwardly 34b corresponding to the electrical field vector Ea or Eb, whereby the liquid crystal molecules become oriented to either one of the first stable state 33a or the second stable state 33b, correspondingly.

Use of such a ferroelectric liquid crystal as the optical modulating device gives principally two advantages. Firstly, the response speed is extremely fast, and secondly, alignment of the liquid crystal molecules has bistability. To describe about the second point by referring to, for example, FIG. 2, application of an electrical field Ea makes liquid crystal molecules oriented to the first stable state 33a, which is stably retained even if the electrical field is removed. On the other hand, when an electrical field Eb in the opposite direction is applied, the liquid crystal molecules are oriented to the second stable state 33b to change the directions of the molecules, which state is also stably retained even if the electrical field is removed. Also, unless the electrical field Ea or Eb given exceeds a certain threshold value, the respective alignment states are also maintained. In order to effectively realize such a fast response speed and bistability, the cell may preferably have as small a thickness as possible, generally in the range of 0.5–20 microns, particularly 1–5 microns. A liquid crystal electro-optical device having a matrix electrode structure and using a ferroelectric liquid crystal of this type has been proposed by, e.g., Clark and Lagerwall in U.S. Pat. No. 4,367,924.

As a result of our study for optimization of a liquid crystal device by appropriate arrangement of a polarizer and an analyzer in combination with molecular alignments of a smectic liquid crystal having a ferroelectricity, we have obtained the following knowledge. Namely, such liquid crystal molecules do not always assume simple alignment or orientation states as described above but can assume different alignment states depending on factors, such as the treatment of substrates the liquid crystal material and the liquid crystal cell thickness and, in some cases, assume an alignment state including a domain with a minor proportion of area (inverted domain), the size of which changes with the progress of writing or display time, in the display area.

As a result of further investigation, it is possible to obtain improvements in respects of persistence and contrasts by arranging a polarizer and an analyzer so that the above-mentioned inverted domain is placed in a bright state of a pixel or an effective display area.

Figure 3:
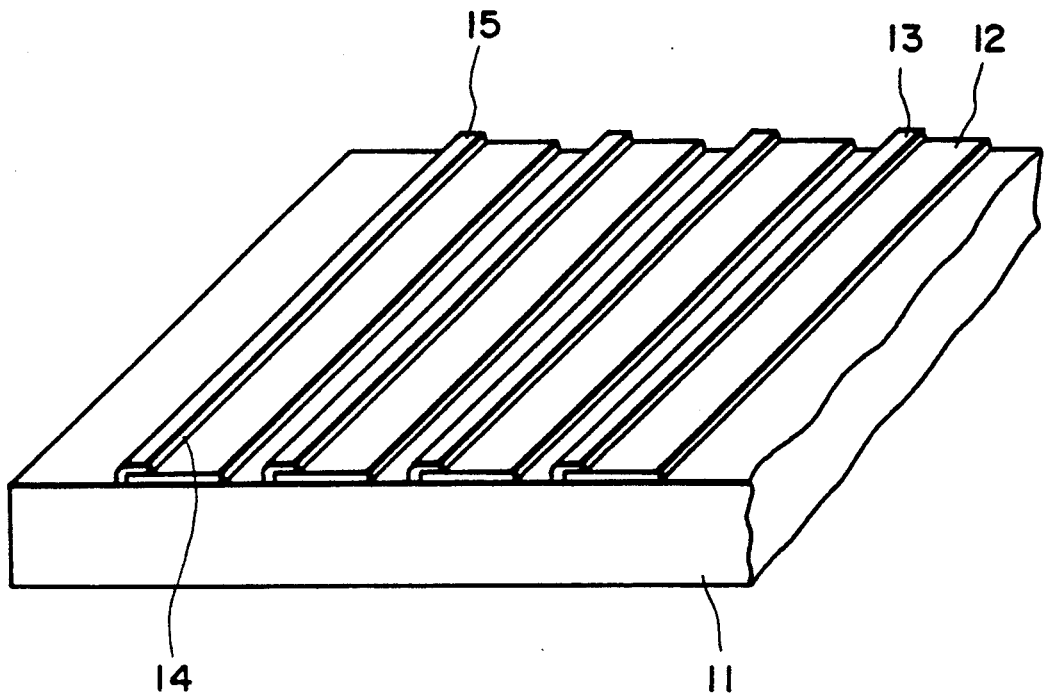
FIG. 3 is a partial perspective view of a substrate which may be used in the invention.

FIG. 3 is a partial perspective view of a substrate 11 used in the present invention. The substrate 11 comprises glass, plastic, etc. On the substrate 11 are formed transparent electrodes 12 formed of, e.g., ITO (indium-tin-oxide), low-resistivity connecting lines or lead wires 13 formed of a metal, such as aluminum, chromium or molybdenum, or an alloy of these metals, each providing a stepwise elevation 14 extended in one direction and forming an edge line 15. The transparent electrodes 12 may be formed in a thickness of 300–5000 Å, preferably 500–2000 Å, and the low-resistivity lead wires 13 may be formed in a thickness of 300–5000 Å, preferably 500–3000 Å.

In the present invention, the substrate 11 may further be coated with an insulating film (not shown) for preventing short circuit between the upper and lower electrodes and thereon with an alignment film (not shown). The insulating film may comprise, e.g., an $SiO_2$ film or $TiO_2$ film. Further, the alignment film may be a film of, e.g., polyvinyl alcohol, polyimide, polyamide, polyester, polyamideimide or polyesterimide.

Figure 4A:
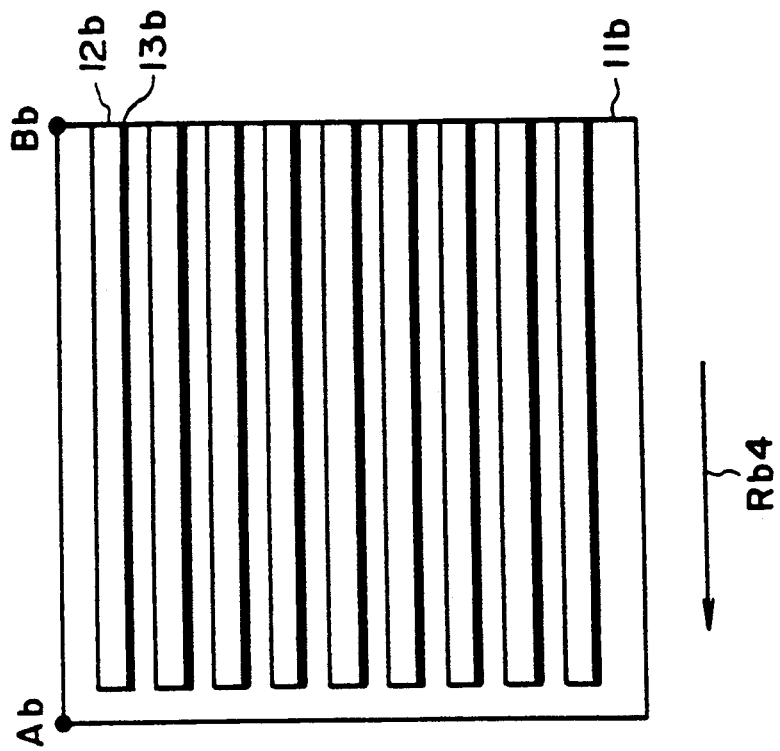
FIGS. 4A(a) and 4A(b) are schematic plan views for illustrating an example of the directions of uniaxial orientation axes applied to a pair of substrates used in the invention.
Figure 4A:
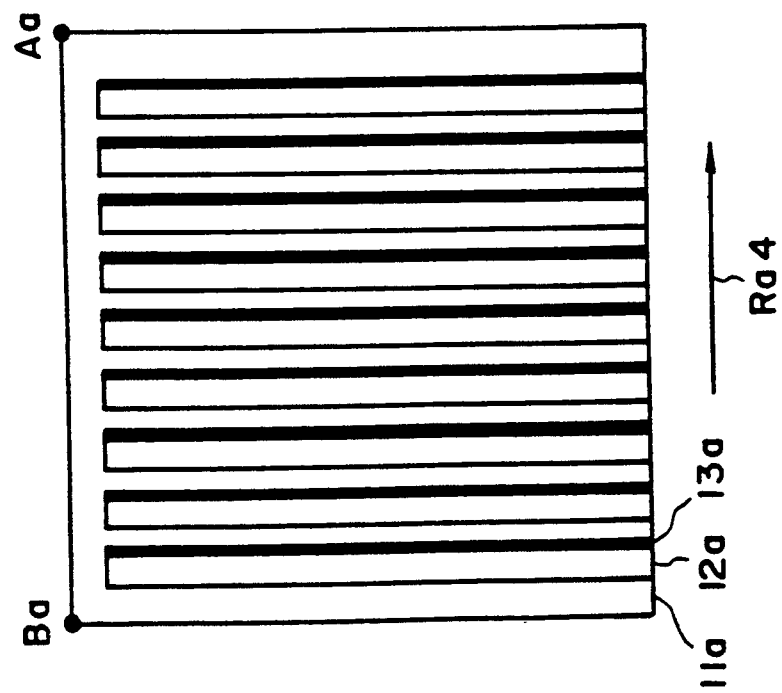

FIGS. 4A(a) and 4A(b) illustrate a pair of substrates 11a and 11b, each similar to one shown in FIG. 3 for constituting a liquid crystal device. In the liquid crystal device, the two substrates 11a and 11b are disposed opposite to each other so that a point Aa and a point Ab, and also a point Ba and Bb, are aligned with each other. The two substrates are provided with uniaxial orientation axes, such as those given by rubbing, in the directions of arrows Ra4 and Rb4, respectively. By disposing the substrates 11a and 11b in the above-described manner, the low-resistivity lead wire 13a and transparent electrode 12a are disposed to intersect the low-resistivity lead wire 13b and transparent electrode 12b, respectively, whereby a pixel P$_4$, for example, is formed as shown in FIG. 4B(b).

Figure 4B:
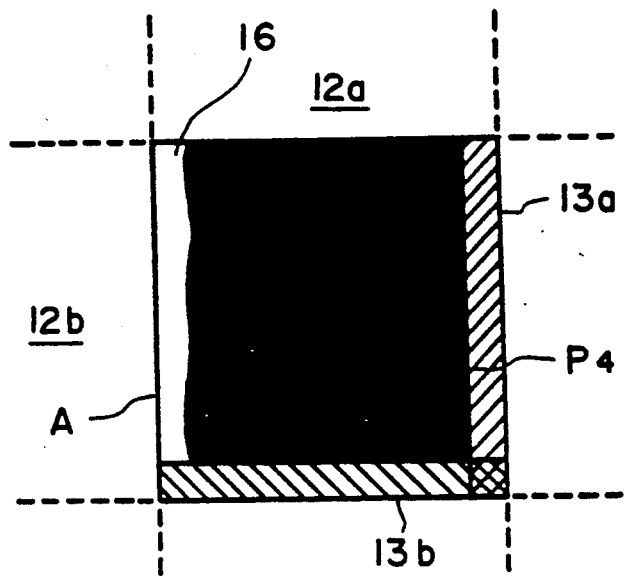
FIGS. 4B(a) and 4B(b) are schematic plan views illustrating a pair of display states obtained by using the pair of substrates shown in FIGS. 4A(a) and 4A(b).
Figure 4B:
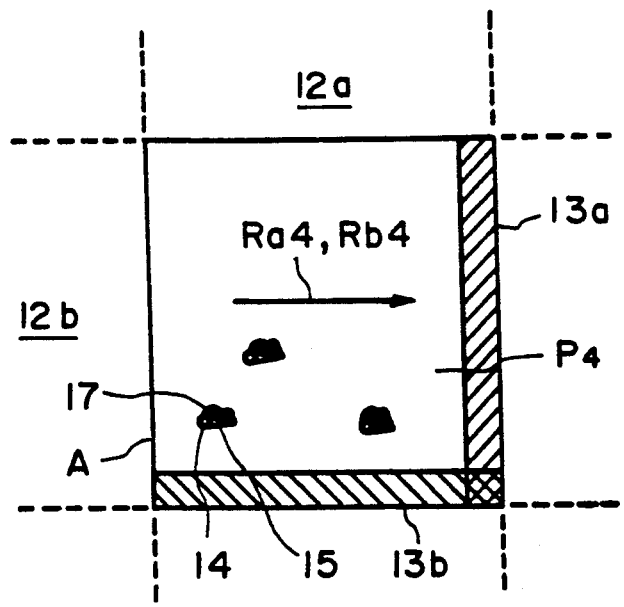

In the pixel P$_4$ shown in FIGS. 4B, the uniaxial orientation axes Ra4 and Rb4 are disposed perpendicular to the low-resistivity lead wire 13a providing a linear projection or elevation in the pixel P$_4$, and the directions thereof are toward the low-resistivity lead wire 13a.

In such a pixel P$_4$ shown in FIGS. 4A and 4B, a plurality of pairs of defects each comprising a hairpin defect 14 and a lightning defect 15, and the hairpin defect 14 and the lightning defect 15 in each pair occur regularly in parallel with the uniaxial orientation axis Ra4 (and Rb4). Further, the lightning defect 15 of the pair of hairpin defect 14 and lightning defect 15 occurs closer than the hairpin defect 14 to the low-resistivity lead wire forming a linear projection.

The above-mentioned hairpin defect 14 and lightning defect 15 occur in pair because of a bead spacer or fiber spacer disposed in a cell. Accordingly, the number of the pairs of hairpin defect and lightning defect occurring in a cell has a correlation with the number of bead spacers or fiber spacers dispersed in the cell. Further, such a pair of hairpin defect 14 and a lightning defect 15 is caused also by slight pressing of a cell by a finger.

Figure 7A:
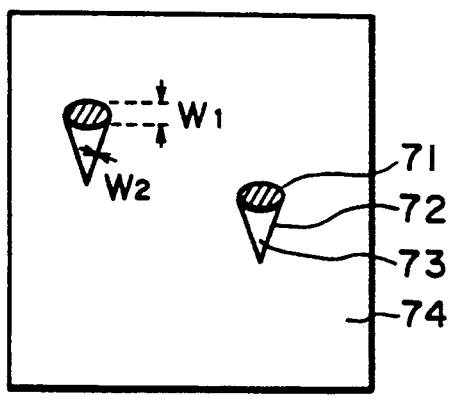
FIG. 7A-7C are explanatory views including a sketch of a hairpin defect and a lightning defect.
Figure 7B:
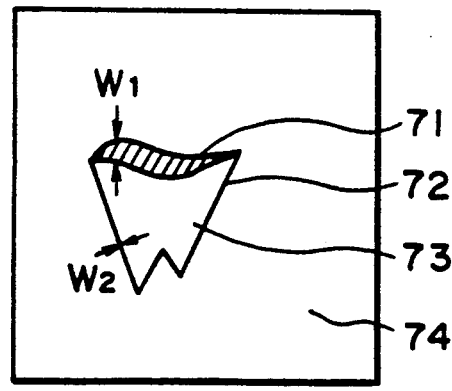
Figure 7C:
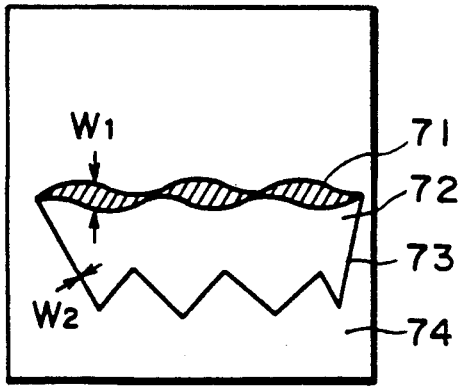

FIGS. 7A–7C are sketches schematically showing modes of occurrence of such hairpin defect 71 and lightning defect 72. More specifically, FIG. 7A illustrates pairs of hairpin defect 71 and lightning defect 72 caused due to bead spacers. FIG. 7B illustrates a defect state given by pressing a cell having a pair of defects as shown in FIG. 7A so as to grow the defects, and FIG. 7C illustrates a state caused by further growing the defect state shown in FIG. 7B.

As shown in FIGS. 7A–7C, (1) the hairpin defect 71 and the lightning defect 72 occur in pair, and the optical states (e.g., transmittance) thereof are generally different from that of the surrounding domain (chiral smectic C$_2$ domain 74) and can be discriminated by a microscope; (2) the width W$_1$ of a hairpin defect 71 is larger than the width W$_2$ of a lightning defect 72, the width W$_1$ of a hairpin defect 71 having generally on the order of 2–10 microns, and he width W$_2$ of a hairpin defect being less than 2 microns; (3) a domain 73 surrounded by a hairpin defect 71 and a lightning defect 72 and a surrounding domain 74 form chiral smectic C phase with different alignment states, so that the respective domains may be defined as chiral smectic C$_1$ domain 73 and chiral smectic C$_2$ domain 74, which shown different optical states (e.g., transmittance) discriminatable by a microscope.

The above-mentioned hairpin defect and lightening defect are generally discussed in Preprint for Liquid Crystal Forum (October, 1987) p.p. 114–115, "Study on Structure of SSFLC State by Microscopic Spectral Analysis". Further, the above-mentioned chiral smectic C$_1$ phase and chiral smectic C$_2$ phase are discussed in U.S. patent applications Ser. No. 245,644 and 295,509 (and corresponding European Patent Applications Nos. 88115325.8 and 89100343.6).

Figure 4C:
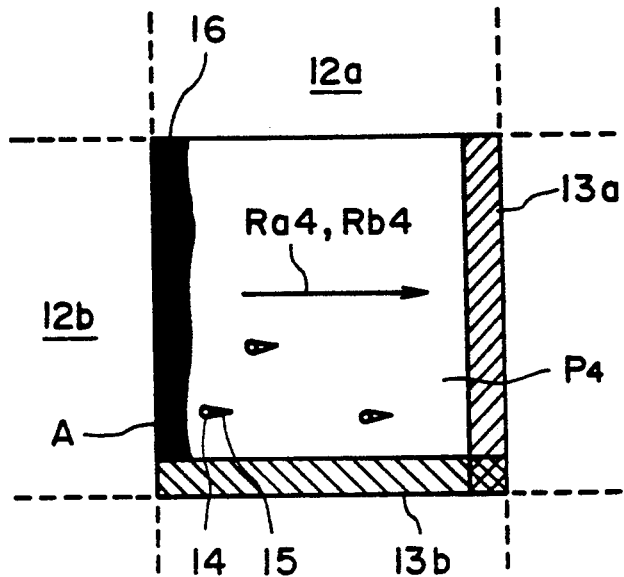
FIGS. 4C(a) and 4C(b) are schematic plan views illustrating another pair of display states obtained by using the pair of substrates shown in FIGS. 4A(a) and 4A(b).
Figure 4C:
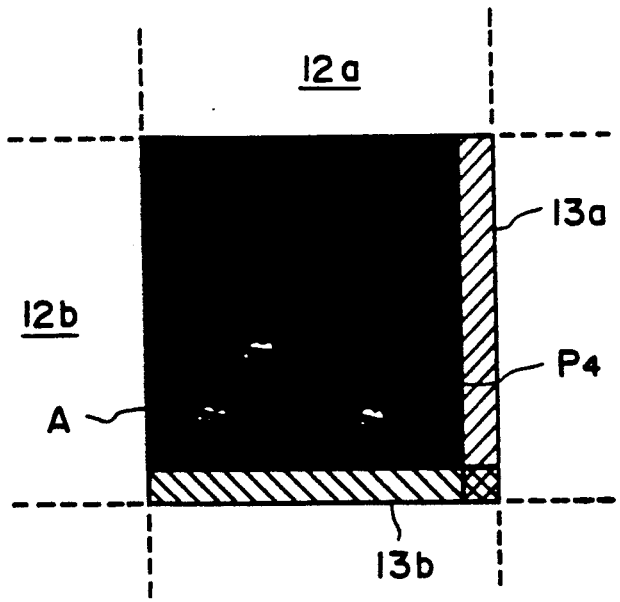
Figure 5:
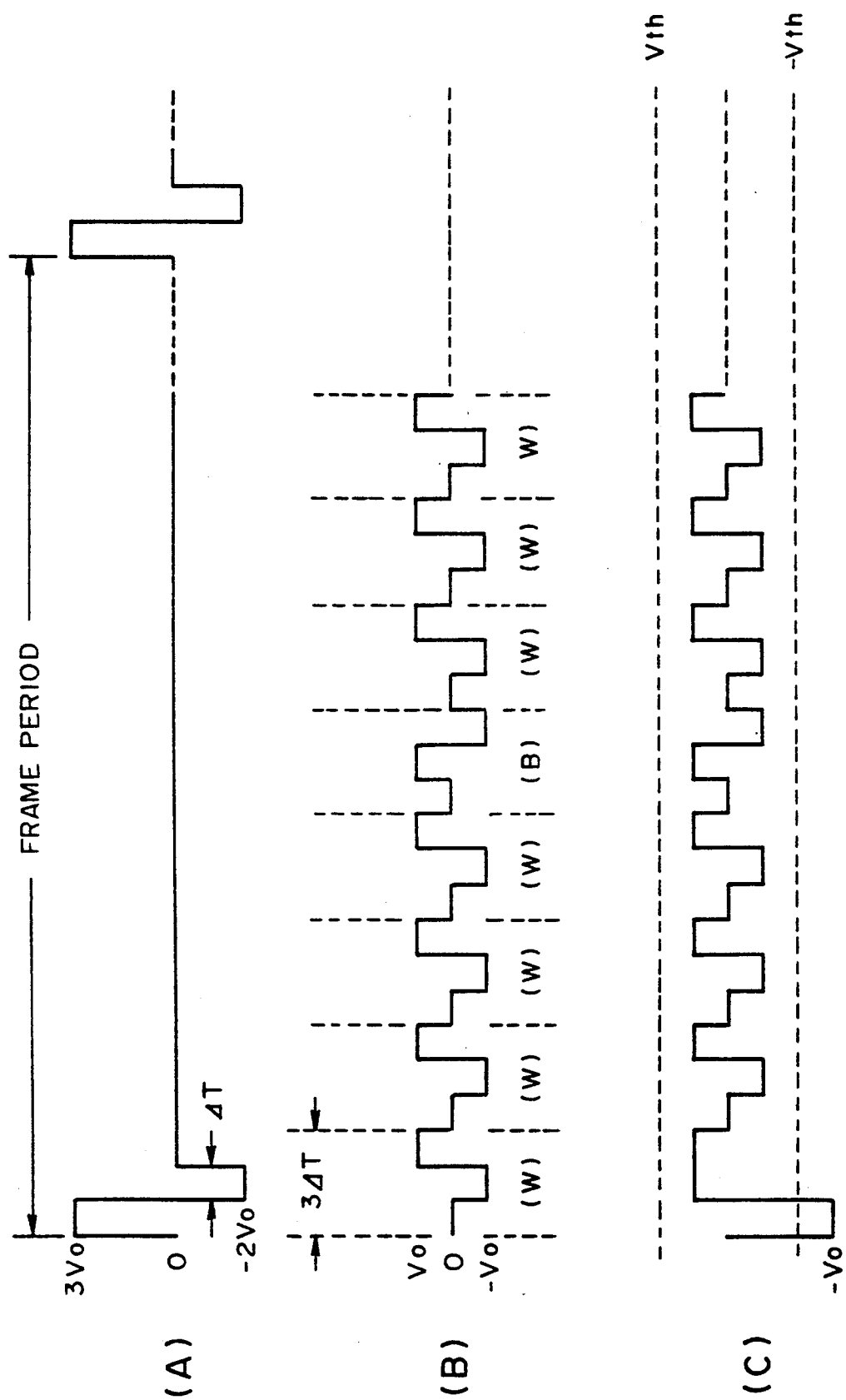
FIG. 5 is a waveform diagram showing driving voltage waveforms used in an embodiment of the present invention.

According to our study, when a liquid crystal device having a matrix of pixels P$_4$ as shown in FIGS. 4B and 4C was subjected to a multiplexing scheme for writing at a frame frequency of 10 Hz as shown in FIG. 5 which shows time-serial waveforms of a scanning signal (A), data signals (B) and voltage signals (C) applied to a pixel P$_4$, a flickering was caused by a periodical change in luminance on a picture when the pixel was in a dark state (black display state). According to our microscopic observation of the above-mentioned liquid crystal device under the multiplexing drive, an inverted portion 16 (a domain with a size which changes (decreases or increases with the progress of a writing time) occurred in a region A on a side opposite to (i.e., remote from) the low-resistivity lead wire 13a periodically and immediately after the application of a voltage $\pm V_a$ exceeding the threshold voltage $\pm V_{th}$. It was found that the occurrence of such an inverted portion 16 led to the above-mentioned flickering. Such an inverted portion 16 formed along a side of a pixel may be more extensively formed in the case of rubbing in the direction as shown in FIGS. 4A–4C than in the case of reverse rubbing direction, respectively, with respect to the low-resistivity lead wire 13a.

Further, when the pixel P$_4$ was in a bright state (white display state), an inverted portion 17 (domain with a size changing with time) occurred on a side of a hairpin defect in each frame cycle but the above-mentioned flickering was not observed.

Incidentally, FIGS. 4B(a) and 4B(b) are sketches of microscopic photographs at a magnification of 200.

The smectic liquid crystal having ferroelectricity used in the present invention may suitably be a liquid crystal in chiral smectic C phase (SmC*), H phase (SmH*), F phase (SmF*), I phase (SmI*), J phase (SmJ*), G phase (SmG*) or K phase (SmK*). Details of such a ferroelectric liquid crystal are described in, e.g., LE JOURNAL DE PHYSIQUE LETTRE, 36 (L-69), 1975, "Ferroelectric Liquid Crystal"; Applied Physics Letters, 36 (11), 1980, "Submicro-Second Bistable Electrooptic Switching in Liquid Crystals; Kotai Butsuri (Solid-State Physics), 16 (141), 1981, "Ekisho (Liquid Crystals)". Ferroelectric liquid crystals disclosed in these references may be used in the present invention. Also usable are chiral smectic liquid crystals disclosed in, e.g., U.S. Pat. Nos. 4,561,726, 4,614,609, 4,589,996, 4,596,667, 4,613,209 and 4,615,586.

FIGS. 6A and 6B illustrate an embodiment of the liquid crystal device according to the present invention. FIG. 6A is a plan view of the embodiment and FIG. 6B is a sectional view taken along the line A—A in FIG. 6A.

A liquid crystal device 600 shown in FIG. 6 comprises a pair of substrates 601 and 601a made of, e.g., glass plates or plastic plates which are held with a predetermined gap with spacers 604 and sealed with an adhesive 606 to form a cell structure. On the substrate 601 is further formed an electrode group (e.g., an electrode group for applying scanning voltages of a matrix electrode structure) comprising a plurality of transparent electrodes 602 in a predetermined pattern, e.g., of a stripe pattern. On the substrate 601a is formed another electrode group (e.g., an electrode group for applying signal voltages of the matrix electrode structure) comprising a plurality of transparent electrodes 602a intersecting with the transparent electrodes 602. The transparent electrodes 602 and 602a are respectively provided with low-resistivity lead wires 610 and 610a.

On the substrate 601a provided with such transparent electrodes 602a may be further formed an alignment control film 605 composed of an inorganic insulating material such as silicon monoxide, silicon dioxide, aluminum oxide, zirconia, magnesium fluoride, cerium oxide, cerium fluoride, silicon nitride, silicon carbide, and boron nitride, or an organic insulating material such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin and acrylic resin.

The alignment control film 605 may be formed by first forming a film of an inorganic insulating material or an organic insulating material as described above and then rubbing the surface thereof in one direction with velvet, cloth, paper, etc.

In another preferred embodiment according to the present invention, the alignment control film 605 may be formed as a film of an inorganic insulating material such as SiO or $SiO_2$ on the substrate 601a by the oblique or tilt vapor deposition.

In still another embodiment, the substrate 601a formed of glass or plastic plate per se or coated with a film of an inorganic insulating material or organic insulating material as described above may be subjected to oblique etching to provide an alignment control effect on the surface.

It is preferred that the alignment control film 605 also functions as an insulating film. For this purpose, the alignment control film may preferably have a thickness in the range of 100 Å to 1 micron, especially 500 to 5000 Å. The insulating film also has a function of preventing the occurrence of an electric current which is generally caused due to minor quantities of impurities contained in the liquid crystal layer 603, whereby deterioration of the liquid crystal compounds is prevented even on repeating operation.

It is possible to form an alignment control film similar to the one denoted by 605 also on the other substrate 606.

In the cell structure 600 shown in FIG. 6, the liquid crystal layer 603 may be formed in a chiral smectic phase comprising a plurality of layers each comprising a plurality of molecules. The chiral smectic liquid crystal 603 is disposed in a layer thin enough to suppress the formation of a helical structure which is inherently formed in its bulk state. The point is disclosed in detail in U.S. Pat. No. 4,367,924.

Such a cell structure 600 having substrates 601 and 601a is sandwiched between a pair of polarizers 607 and 608 disposed in cross nicols or in parallel to form an optical modulation device causing optical modulation when a voltage is applied between electrodes 602 and 602a.

The present invention will be explained more specifically with reference to examples.

EXAMPLE 1

Two 1.1 mm-thick glass plates each provided with 800 Å-thick stripe electrodes were provided. Each stripe electrode 12 was further provided with a 1000 Å-thick molybdenum metal stripe as a low-resistivity lead wire 13 so as to stride the stripe electrode and the substrate surface as shown in FIG. 3. Each substrate was further coated with a 500 Å-thick $SiO_2$ layer for preventing short circuit between the opposing electrodes.

Each substrate was further coated with a 0.1% IPA (isopropanol) solution of aminosilane by a spinner rotating at 2000 rpm for 15 seconds, followed by heating at 150° C., and further coated with a 2% solution of a polyimide forming liquid (SP-510 available from Toray K. K. in a mixture solvent (NMP: n-butylcellosolve = 2:1)) by a spinner rotating at 3000 rpm for 30 seconds. After the film formation, the film was heat-cured at 300° C. for about 1 hour to form a 200 Å-thick polyimide alignment film.

Then, one glass plate (first substrate) was subjected to rubbing of the cured polyimide film in the direction of Rb4 in FIG. 4A(b). The other glass plate (second substrate) was subjected to rubbing of the cured polyimide film in the direction of Ra4 in FIG. 4A(a).

Thereafter, alumina beads having an average particle size of about 1.5 microns were dispersed on one substrate, on which the other substrate was superposed so as to form a parallel rubbing structure as shown in FIG. 4A and 4B, followed by adhesion to form a cell.

The cell (gap) thickness was measured to be about 1.5 microns by a Berek compensator (measurement by phase difference). Into the cell, a chiral smectic liquid crystal "CS-1014" (available from Chisso K. K.) in isotropic phase was injected under vacuum and, after seating, aligned by cooling from isotropic phase at a rate of 0.5° C./hr. Experiments described hereinafter were further performed at 25° C.

The liquid crystal "CS-1014" showed the following phase transition series.

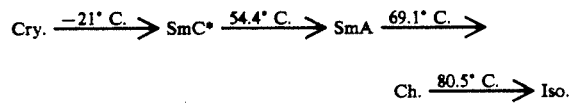

SmA: smectic A phase
Ch.: cholesteric phase
Iso.: isotropic phase

As a result of observation through right angle cross nicols, the liquid crystal in the cell showed a uniform monodomain free of defects of chiral smectic C phase in a non-helical structure.

Further, the liquid crystal cell was held at 60° C. to provide SmA alignment phase and observed through a polarizing microscope with right angle cross nicols to measure the direction of the smectic molecular layers by utilizing the fact that the liquid crystal molecules are aligned perpendicular to the molecular layers in the SmA phase. As a result, it was confirmed that the smectic molecular layers were aligned perpendicular to the rubbing direction.

The liquid crystal device was subjected to writing according to the driving scheme shown in FIG. 5 ($\Delta T = 50$ μsec, $V_0 = 10$ volts).

According to the driving scheme, a bright state and a dark state were written in one frame, and one-scanning period of $3\Delta T$ was used with respect to a writing pulse duration of $\Delta T$. Referring to FIG. 5, at (A) is shown a scanning signal applied to an n-th scanning line Sn; at (B) are shown data signals applied to a data line I for providing a sequence of W(white) W→W→W→B (black) →W→W→W; and at (C) is shown a synthetic voltage waveform applied to a pixel formed at the intersection of the scanning line Sn and the data line I.

Figure 8:
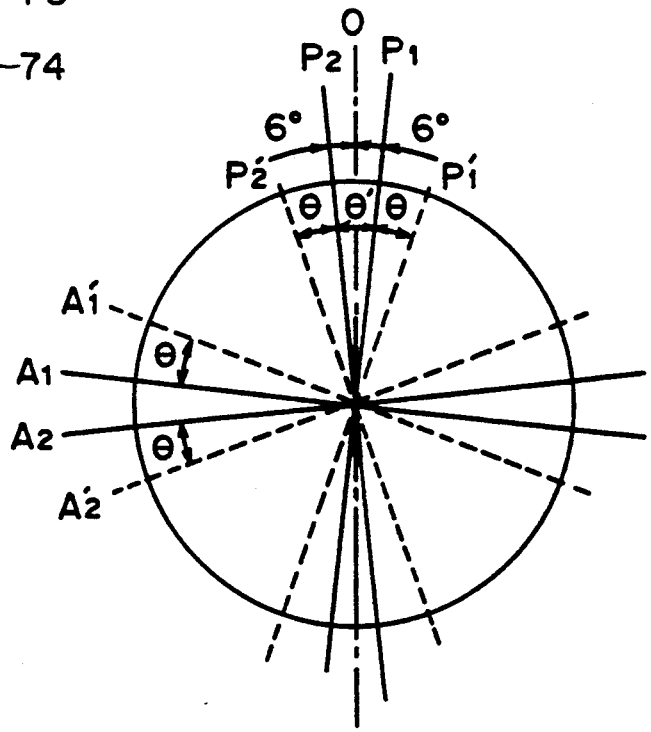
FIG. 8 is a schematic plan view illustrating a positional relationship between a polarizer and an analyzer satisfying the invention.

FIG. 8 illustrates an arrangement of a light source/a polarizer/a liquid crystal cell/an analyzer observed from eyes placed on the optical path.

Referring to FIG. 8, the axis O represents a rubbing direction (uniaxial alignment direction), and the transmission (or absorption) axes of the polarizer and analyzer are represented by $P_1$, $P_2$ and $A_1$, $A_2$, respectively.

As described above, in SmC* phase formed by gradual cooling from isotropic phase, two stable states can be observed. More specifically, when a liquid crystal cell is observed through a polarizer and an analyzer disposed to provide transmission axes (or absorption axes) crossing each other at right angles and the transmission (or absorption) axes are set at appropriate angles with respect to the axis O of the liquid crystal cell, two types of domains forming generally a mottled pattern may be observed in the cell.

For example, when the liquid crystal cell is held at a temperature of 50° C., the transmission (or absorption) axis $P_1$ of the polarizer is disposed to form an angle of 6 degrees from the axis O, and the transmission (or absorption) axis $A_1$ of the analyzer is disposed to have an angle of 90 degrees from the axis $P_1$ as shown in FIG. 8, the two types of domains are observed at the largest contrast in this system to provide a dark state (black) and a bright state (white), respectively. On the other hand, if the transmission (or absorption) axes of the polarizer/analyzer are rotated to the positions ($P_2/A_2$) which are symmetrical to the previous positions ($P_1/A_1$) with respect to the axis O, the above-mentioned domains provide inverted optical states. More specifically, the domain having formed a dark (black) state at the ($P_1/A_1$) position is inverted into a bright (white) state, and the domain having formed a bright (white) state at the ($P_1/A_1$) position is inverted into a dark (black) state.

Further, when the transmission (or absorption) axes $P_1$ and $A_1$ are set to form an intersection angle of 90 degrees (right angle cross nicols), a DC voltage of one polarity (e.g., +) is applied between the opposite substrates, the entire cell is converted into a dark (black) state. Then, if a DC voltage of the other polarity (e.g., −) is applied, the entire cell is converted into a bright (white) state.

From the above observation, the two stable states may be considered to represent two states wherein the projection of the liquid crystal molecular axes onto the substrate surfaces is averagely directed the axis $P_1$ direction and is averagely directed to the axis $P_2$ direction. As these states are switched to each other by application of DC voltage pulses of mutually opposite polarities, these two states may be considered to respectively have average electrical dipole moments which are vertical to the substrate surfaces, definite in magnitude and of mutually opposite polarities.

In the above example, when the polarizer was disposed to have its transmission (or absorption) axis at $P_1$ and the analyzer was disposed to have its transmission (or absorption) axis at $A_1$ as shown in FIG. 8, the darkest state was obtained in one stable state to provide the largest contrast in comparison with the other stable state.

When the alignment states of a pixel in the liquid crystal cell were observed through a microscope at a magnification of 200, domains having hairpin defects and lightening defects caused by alumina beads were found to be formed as shown in FIGS. 4B(a) and 4B(b).

As has been described with reference to FIGS. 4B(a) and 4B(b), when the liquid crystal device having a matrix of pixels as shown in FIGS. 4B(a) and 4B(b) was subjected to the multiplexing scheme shown in FIG. 5, a flickering was caused by a periodical change in luminance on a picture when the pixel is in a dark state (black display state), and it was also found that the flickering was caused by the occurrence of an inverted portion 16 (a domain of a minor areal proportion with a size changing with time) on a side A free from a low-resistivity lead wire 13a as shown in FIG. 4B(a).

Further, in the case where the pixel $P_4$ was in a bright state (white display state), an inverted portion 17 (a domain with a size changing with time) occurred on a side of a hair pin defect in each frame cycle as shown in FIG. 4B(b), but the above-mentioned flickering was not observed.

Then, the polarizer was disposed to have its transmission (or absorption) axis at $P_2$ and the analyzer was disposed to have its transmission (or absorption) axis at $A_2$ shown in FIG. 8, the darkest state was obtained in the other stable state of the cell to provide the largest contrast with one stable state. Thus, the display states of each pixel and domain were inverted. More specifically, the microscopic display state of a pixel were change from those shown in FIGS. 4B(a) and 4B(b) to those shown in FIGS. 4C(a) and 4C(b), respectively.

Then, the liquid crystal device forming a matrix of pixels as shown in FIG. 4C(a) and 4C(b) were subjected to the multiplexing scheme shown in FIG. 5 for writing at a frame frequency of 10 Hz, no flickering due to a periodical change in luminance in a pixel when the pixel was in a dark display state. When the liquid crystal device under the multiplexing drive was observed through a microscope, an inverted portion (with a size changing with time) was formed on a side A free from a low-resistivity lead wire at each cycle but the occurrence of such an inverted portion 11 did not cause the above-mentioned flickering.

Further, when the pixel $P_4$ was in the dark state (black display state) an inverted portion 17 occurred on a side of a hairpin defect in each frame cycle, but no flickering was observed.

As is understood from the above description, referring to FIG. 8, when the transmission (or absorption) axis of the polarizer is disposed at $P_2$ and the transmission (or absorption) axis of the analyzer is disposed at $A_2$, flickering is suppressed under multiplexing drive. More specifically, in case where there is a domain having a size changing with the progress of writing time, an improved flickering characteristic is provided by disposing the polarizer and analyzer so that the total area of such a domain present in a bright pixel state is larger than the total area of such a domain present in a dark pixel state.

Further, the persistence time and the contrast ratio of the device varied according to the polarizer/analyzer positions between $P_1/A_1$ and $P_2/A_2$ as shown in the following Table 1.

TABLE 1

| | (at 25° C.) | |
|---|---|---|
| | Polarizer position | |
| | $P_1/A_1$ | $P_2/A_2$ |
| Persistence time | 2.5 sec | 1.9 sec |
| Contrast ratio | 3.5 | 4.0 |

Thus, according to the present invention, the flickering characteristic, persistence (or after image) time and contrast ratio have been remarkably improved.

The reason why flickering is caused by occurrence of an inverted portion and change in size thereof may be considered as follows.

In the case where a pixel is used for black display as shown in FIG. 4B(a), the luminance or brightness of a major part of the pixel display "black" is denoted by B, and the luminance or brightness of an inverted portion 16 display "white" is denoted by W. Now, it is assumed that the areal ratio of the inverted portion to the entire pixel is n:1. In this case, the proportion of the luminance of the inverted portion to that of the entire pixel is given by:

$$\frac{n \times W}{n \times W \times (1-n) \times 13} = \left(1 + \frac{1-n}{n} + \frac{B}{W}\right)^{-1} \quad (1)$$

On the other hand, in the case where a pixel is used for white display as shown in FIG. 4C(a), the proportion of the luminance of the inverted portion to that of the entire pixel is given by:

$$\frac{n \times B}{n \times B + (1-n)W} = \left(1 + \frac{1-n}{n} + \frac{W}{B}\right)^{-1} \quad (2)$$

Generally, n is on the order of 0.01 (1%), and W:B are on the order of 80:20, respectively, (contrast ratio $W/B \approx 4.0$). If these values are substituted, the equation (1) gives a value of $3.9 \times 10^{-2}$ and the equation (2) gives $2.5 \times 10^{-3}$. Thus, the equation (1) provides a luminance proportion of the inverted proportion which is about 16 times that given by the equation (2), so that a more noticeable change in luminance by that much to give a cause of the flickering. This flickering preventing effect given by the state represented by the equation (2) becomes larger as the contrast ratio W/B therein is increased.

Referring again to FIG. 8, similar effects were obtained also in a case where the polarizer and analyzer positions were shifted while retaining their cross nicol relationship in a direction providing a brighter bright state given by the other stable state (to, e.g., $P_1'/A_1'$ or $P_2'/A_2'$ by an angle $\theta$ (=6 degrees) from the polarizer-/analyzer positions (e.g., $P_1/A_1$ or $P_2/A_2$) giving the darkest state in one stable state of the chiral smectic liquid crystal. Further, similar effects were obtained also in a case where either one of the polarizer and analyzer was shifted by an angle $\theta$ (=6 degrees) in a direction providing a brighter bright state given by the other stable state.

Figure 10:
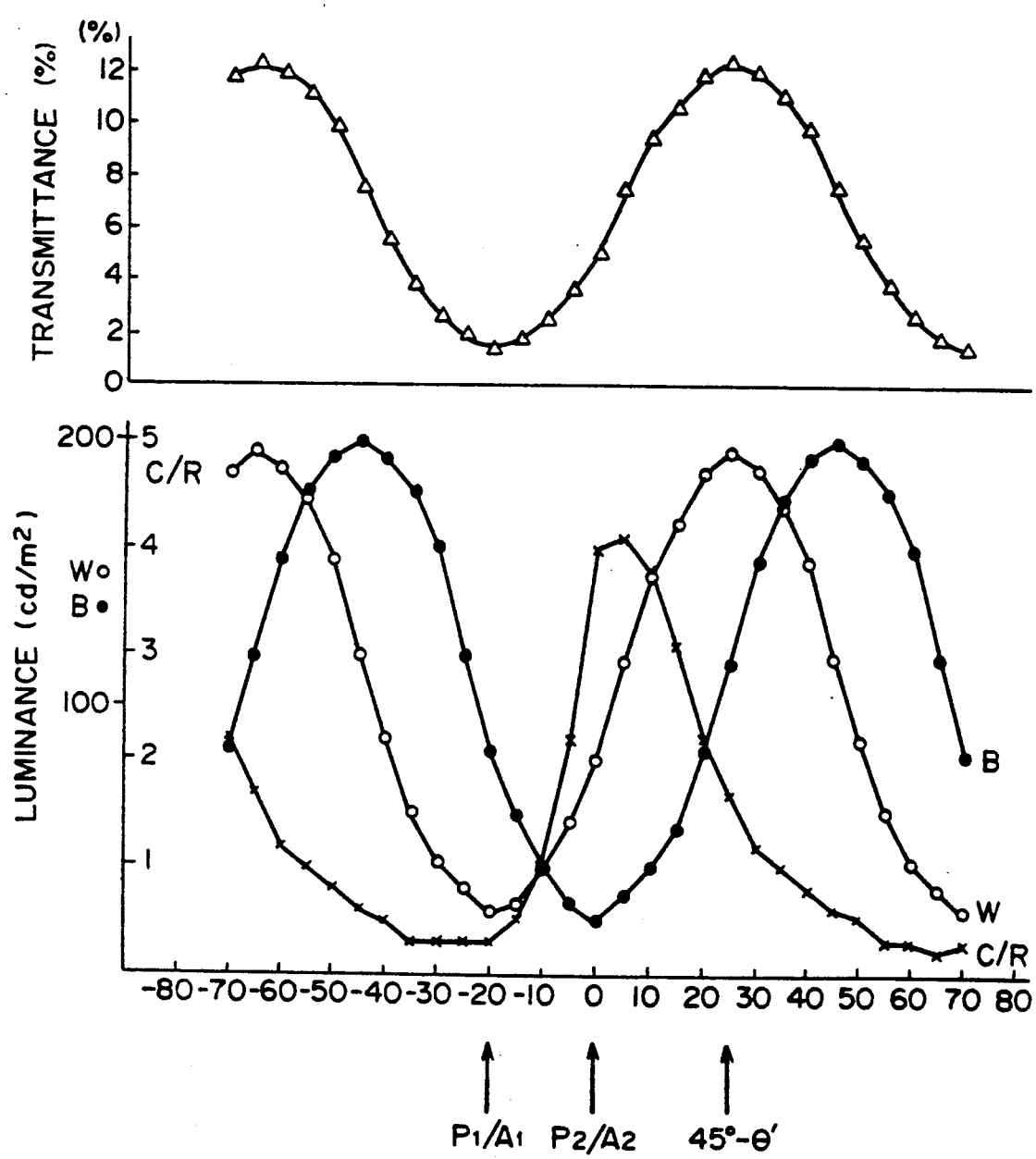
FIG. 10 is a graph showing changes in optical characteristics of a liquid crystal device of the invention depending on changes in polarizer angles.

Table 2 given below and FIG. 10 summarize values of transmittance, contrast ratio and luminance obtained at various values of the angle $\theta$. In FIG. 10, the standard position ($\theta=0$) is taken in the case where the polarizer and the analyzer were disposed while retaining the cross nicols relationship to provide the darkest state in the second stable state ($P_2/A_2$). From FIG. 10, it is understood that the angle $\theta'$ shown in FIG. 8 was 20 degrees. In FIG. 10 the sign of angle $\theta$ (of rotation of the polarizer and analyzer) is taken as positive in the direction giving a brighter state in the first stable state. Referring to FIG. 10, when the polarizer and analyzer were rotated while retaining their cross nicol relationship in a direction providing a brighter state in the first stable state, no flickering was observed and a similar improvement in persistence time was attained in a region ($0 < \theta \leq 25$ degrees) up to the rotation angle $\theta$ of 25 degrees (=45 degrees $-\theta'$). In this region, the contrast ratio was shiftly lowered but, on the other hand, transmittance was increased to provide a brighter display picture. In such a brighter picture, the luminance change due to a change in area of the inverted portion was made relatively small in comparison with the luminance of the whole picture, so that the flicker prevention effect was increased.

TABLE 2

| $\theta$ (deg.) | W (cd/m$^2$) | B (cd/m$^2$) | W/B (= C/R) | B/W* | Transmittance (%) |
|---|---|---|---|---|---|
| −70 | 188 | 84 | 2.2 | — | 11.8 |
| −65 | 196 | 118 | 1.7 | — | 12.3 |
| −60 | 190 | 156 | 1.2 | — | 11.9 |
| −55 | 178 | 180 | 1.0 | 1.0 | 11.1 |
| −50 | 156 | 194 | 0.8 | 1.2 | 9.8 |
| −45 | 120 | 200 | 0.6 | 1.7 | 7.5 |
| −40 | 88 | 193 | 0.5 | 2.2 | 5.5 |
| −35 | 60 | 182 | 0.3 | 3.0 | 3.8 |
| −30 | 42 | 161 | 0.3 | 3.8 | 2.6 |
| −25 | 32 | 120 | 0.3 | 3.8 | 2.0 |
| −20 | 23 | 83 | 0.3 | 3.6 | 1.4 |
| −15 | 29 | 60 | 0.5 | 2.1 | 1.8 |
| −10 | 40 | 40 | 1.0 | 1.0 | 2.5 |
| −5 | 58 | 26 | 2.2 | — | 3.6 |
| 0 | 80 | 20 | 4.0 | — | 5.0 |
| 5 | 118 | 29 | 4.1 | — | 7.4 |
| 10 | 150 | 40 | 3.8 | — | 9.4 |
| 15 | 170 | 55 | 3.1 | — | 10.6 |
| 20 | 188 | 84 | 2.2 | — | 11.8 |
| 25 | 196 | 118 | 1.7 | — | 12.3 |
| 30 | 190 | 156 | 1.2 | — | 11.9 |
| 35 | 176 | 179 | 1.0 | 1.0 | 11 |
| 40 | 156 | 194 | 0.8 | 1.2 | 9.8 |
| 45 | 120 | 200 | 0.6 | 1.7 | 7.5 |
| 50 | 88 | 193 | 0.5 | 2.2 | 5.5 |
| 55 | 61 | 182 | 0.3 | 3.0 | 3.8 |
| 60 | 42 | 161 | 0.3 | 3.8 | 2.6 |
| 65 | 28 | 120 | 0.2 | 3.8 | 1.8 |
| 70 | 23 | 83 | 0.3 | 3.6 | 1.4 |

*B/W: for inversion display

EXAMPLE 2

Figure 9A:
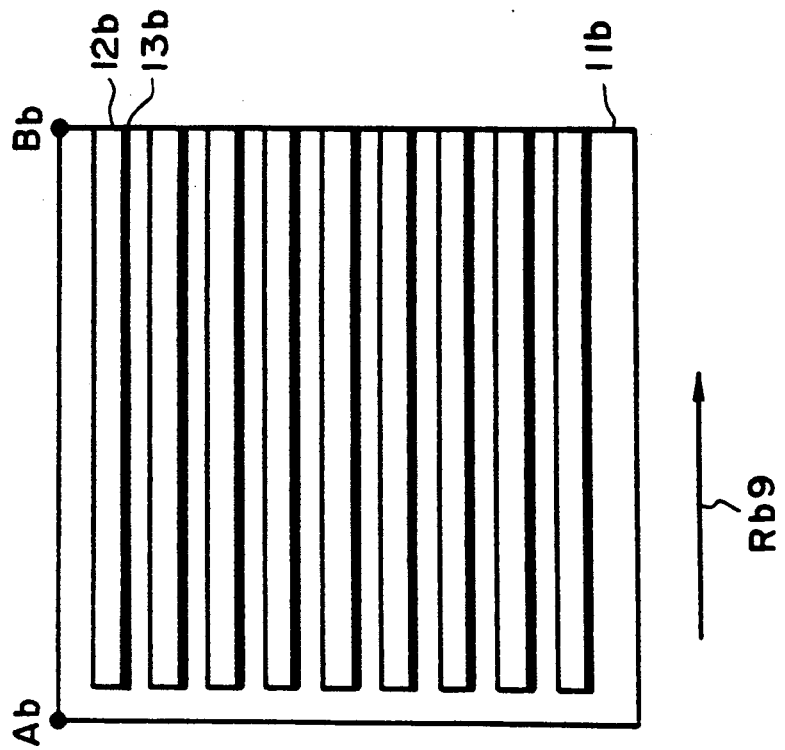
FIGS. 9A(a) and 9A(b) are schematic plan views for illustrating another example of the directions of uniaxial orientation axes applied to a pair of substrates used in the invention.
Figure 9A:
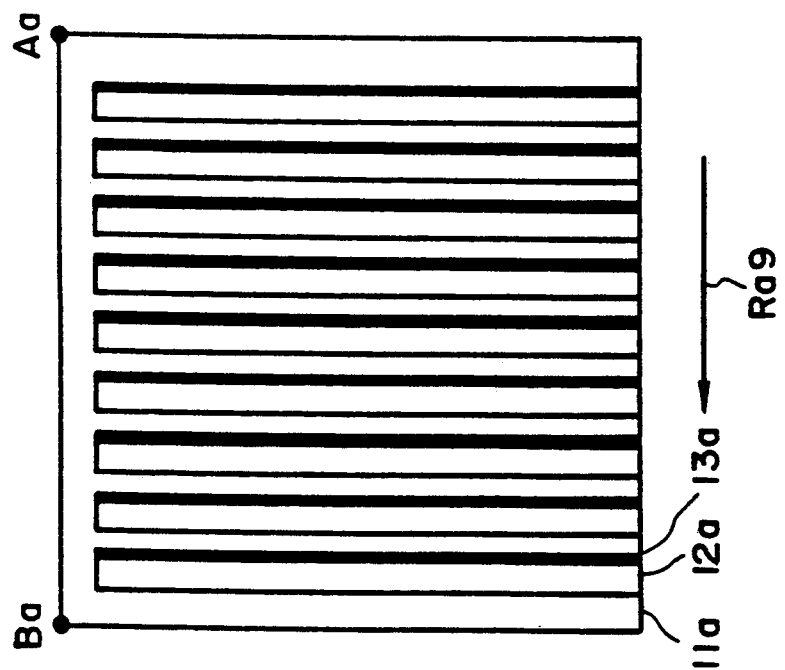

A liquid crystal cell was prepared in the same manner as in Example 1 except that the rubbing directions were changed as shown in FIGS. 9A(a) and 9A(b) and tested in the same manner as in Example 1.

Figure 9B:
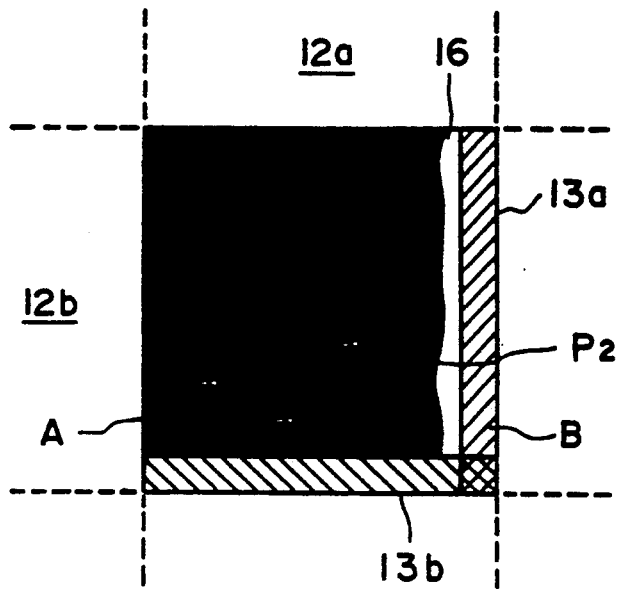
FIGS. 9B(a) and 9B(b) are schematic plan views illustrating a pair of display states obtained by using the pair of substrates shown in FIGS. 9A(a) and 9A(b).
Figure 9B:
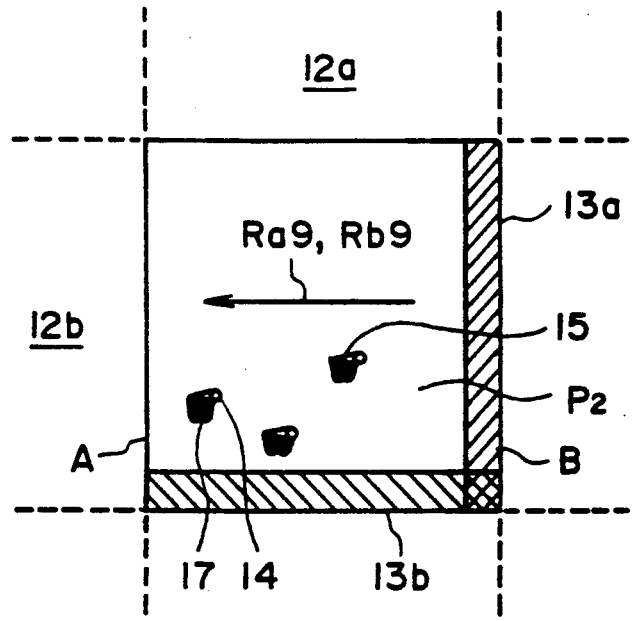

In this case, a reverse inverted domain (inverted portion 16) was formed on a side B with a low-resistivity lead wire 13a as shown in FIG. 9B(a) at the time of the multiplexing drive in a direction (e.g., black→white) reverse to that of pixel writing (e.g., white→black).

When the alignment state in a pixel was observed, pairs of hairpin defects and lightning defects due to alumina beads were observed and reverse inverted domains (inverted portions 17) occurred on a side of the lightning defects in a direction reverse to the pixel writing.

Figure 9C:
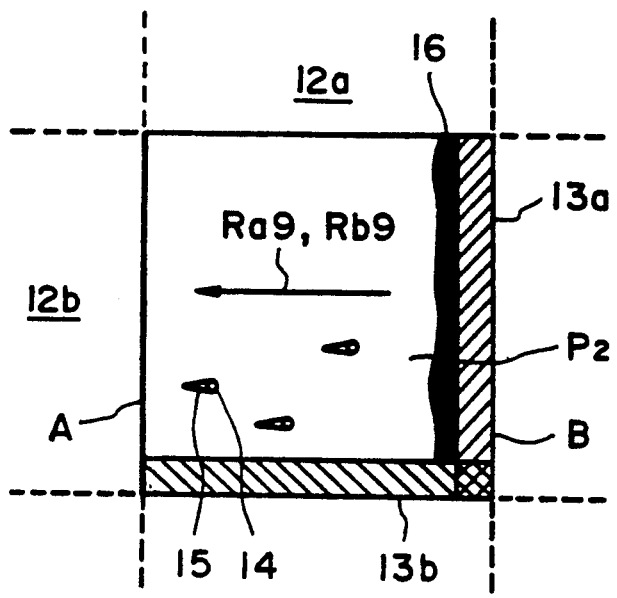
FIGS. 9C(a) and 9C(b) are schematic plan views illustrating another pair of display states obtained by using the pair of substrates shown in FIGS. 9A(a) and 9A(b).
Figure 9C:
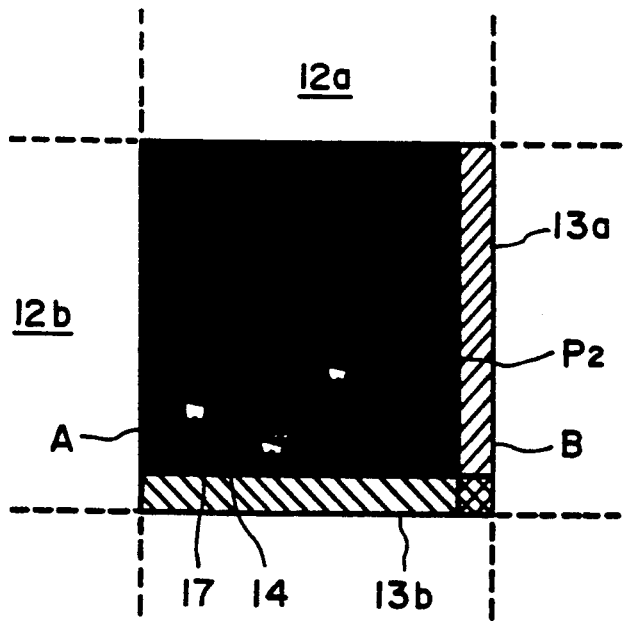

Also in this case, similar effects as in Example 1 were obtained. More specifically, when the inverted domains were present as shown in FIGS. 9B(a) and 9B(b), flickering was observed. On the other hand, when the polarizer and analyzer were rearranged to provide such inverted domains as shown in FIGS. 9C(a) and 9C(b), no flickering was observed and the contrast and/or transmittance were improved while improving the persistence.

EXAMPLES 3-8

Liquid crystal cells were prepared in the same manner as in Example 1 except that alignment film materials and liquid crystal materials shown in the following Table 3 were used, whereby similar results as shown in Example 1 were obtained.

TABLE 3

| Example | Alignment film | Liquid crystal material |
| --- | --- | --- |
| 3 | "SE 100", mfd. by Nissan Kagaku K.K. | "CS 1014" mfd. by Chisso K.K. |
| 4 | "SE 100", mfd. by Nissan Kagaku K.K. | "CS 1011" mfd. by Chisso K.K. |
| 5 | "SE 4110". mfd. by Nissan Kagaku K.K. | "CS 1014" mfd. by Chisso K.K. |
| 6 | "SE 4110". mfd. by Nissan Kagaku K.K. | "CS 1011" mfd. by Chisso K.K. |
| 7 | "LP 64" mfd. by Toray K.K. | "CS 1014" mfd. by Chisso K.K. |
| 8 | "LP 64" mfd. by Toray K.K. | "CS 1011" mfd. by Chisso K.K. |

"SE 100", "SE 4110" and "LP 64" in the above table are respectively a polyimide film-forming resin liquid.

As described above, according to the present invention, for a liquid crystal display device having a domain with a size changing with the progress of writing time in the effective display area, a polarizer and an analyzer are disposed at optimum positions to provide a liquid crystal display device which is free from flickering on the entire picture area, has an improved persistence characteristic and also has improved display qualities, such as improved contrast and/or transmittance.

The above-described liquid crystal device may also be applicable to an image recording apparatus instead of an image display apparatus as described above.

Figure 12:
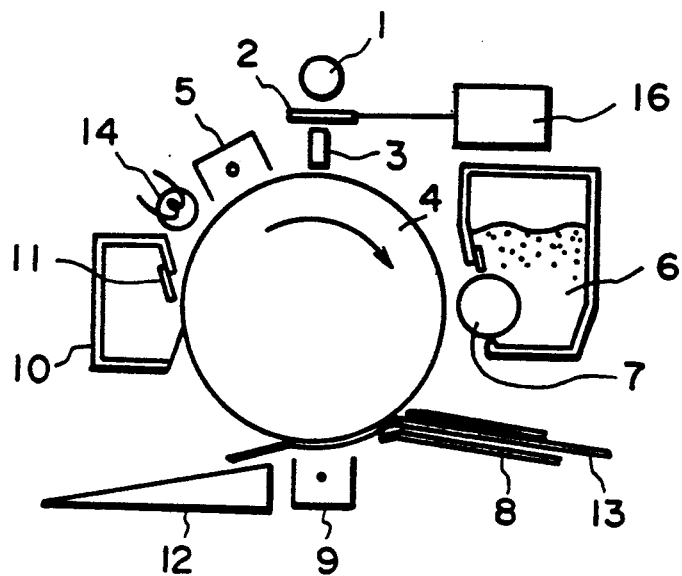
FIG. 12 is a schematic illustration of an image recording apparatus using a liquid crystal device of the invention.
Figure 13:
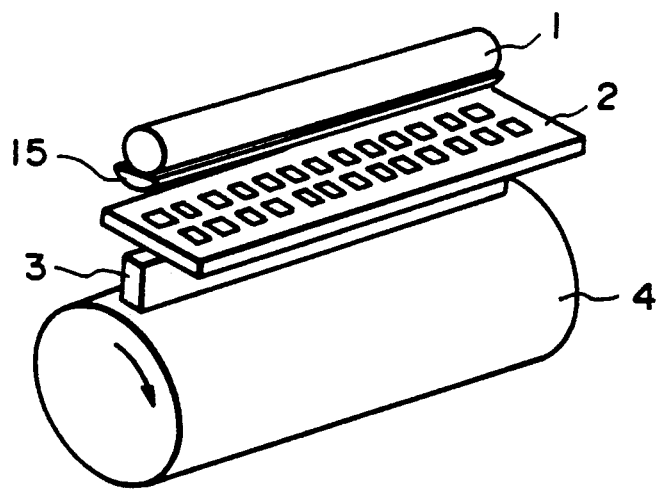
FIG. 13 is a perspective view showing essential parts of the image recording apparatus.

FIG. 12 illustrates an electrophotographic image recording apparatus in which the above-mentioned liquid crystal device is used as a liquid crystal shutter for modulating and controlling light-exposure of a photosensitive member. Referring to FIG. 12, the image recording apparatus includes an exposure lamp 1 as a light source, a liquid crystal shutter 2 (including two polarizers not specifically shown), an array of short-focus image formation elements 3, a photosensitive drum 4, an electric charger 5, a developing device 6, a developing sleeve 7, a transfer guide 8, a transfer charger 9, a cleaning device 10, a cleaning blade 11, and a conveyer guide 12. In operation, the photosensitive drum 4 rotating in the direction of an arrow as shown in charged by means of an electric charger 5 and then exposed to modulated light depending on image signals to form an electrostatic latent image. Optical modulation for producing the modulated light is performed, as shown in FIG. 13, by transmitting or interrupting light from the exposure lamp 2 by means of the liquid crystal shutter array 3 arranged in parallel with the axis of the photosensitive drum 4. In the liquid crystal shutter array, a large number of liquid crystal shutter elements (pixels) are arranged in a staggered fashion so as to increase the arrangement density of the shutter elements. A rod lens 15 may be used as desired for condensing the light from the exposure lamp 1 onto the liquid crystal shutter array 2.

The thus formed electrostatic latent image is developed by attachment of a charged toner on the developing sleeve 7. The toner image thus formed on the photosensitive drum 4 is transferred to a transfer paper 13 supplied from a paper-supplying cassette (not shown) under discharge from the backside of the transfer paper 13 by the transfer charger 9, and the transferred toner image on the transfer paper 13 is conveyed by the conveyer means 12 to a fixing device (not shown) and fixed thereat onto the transfer paper 13. On the other hand, a portion of the toner remaining on the photosensitive drum 4 without being transferred is scraped off the drum surface by the cleaning blade 11 to be recovered in the cleaning device 10. The charge remaining on the photosensitive drum is extinguished by illumination from a pre-exposure lamp 14.

What is claimed is:

1. A liquid crystal display apparatus, comprising:
   a liquid crystal device, comprising a pair of substrates having thereon opposite electrodes, a ferroelectric smectic liquid crystal disposed between the electrodes so as to have two stable molecular orientation states, and a polarizer and an analyzer disposed adjacent to the substrates so that one of the two stable molecular orientation states provides a dark state and the other of the two stable molecular orientation states provides a bright state; wherein a domain with a minor areal size changing with time is formed in an effective display area, and the polarizer and the analyzer are disposed so that the domain is present in a bright state of the effective display area;
   a means for controlling a drive of the liquid crystal device; and
   a means for controlling power supply to the drive controlling means of the liquid crystal device.

2. A liquid crystal display device comprising:
   a liquid crystal device comprising a pair of substrates having thereon opposite electrodes, a ferroelectric smectic liquid crystal disposed between the electrodes so as to have two stable molecular orientation states, and a polarizer and an analyzer disposed adjacent to the substrates so that one of the two stable molecular orientation states provides a dark state and the other of the two stable molecular orientation states provides a bright state; wherein a domain with a minor areal size changing with time is formed in an effective display area, and the polarizer and the analyzer are disposed so that the domain is present in a larger total area when it is present in a bright state of the effective display area than when it is present in a dark state of the effective display area;
   a means for driving the liquid crystal device depending on given image signals; and
   a light source; and
   a means for controlling a drive of the liquid crystal device and a means for controlling power supply to the drive controlling means of the liquid crystal device.

* * * * *